Figure 2:
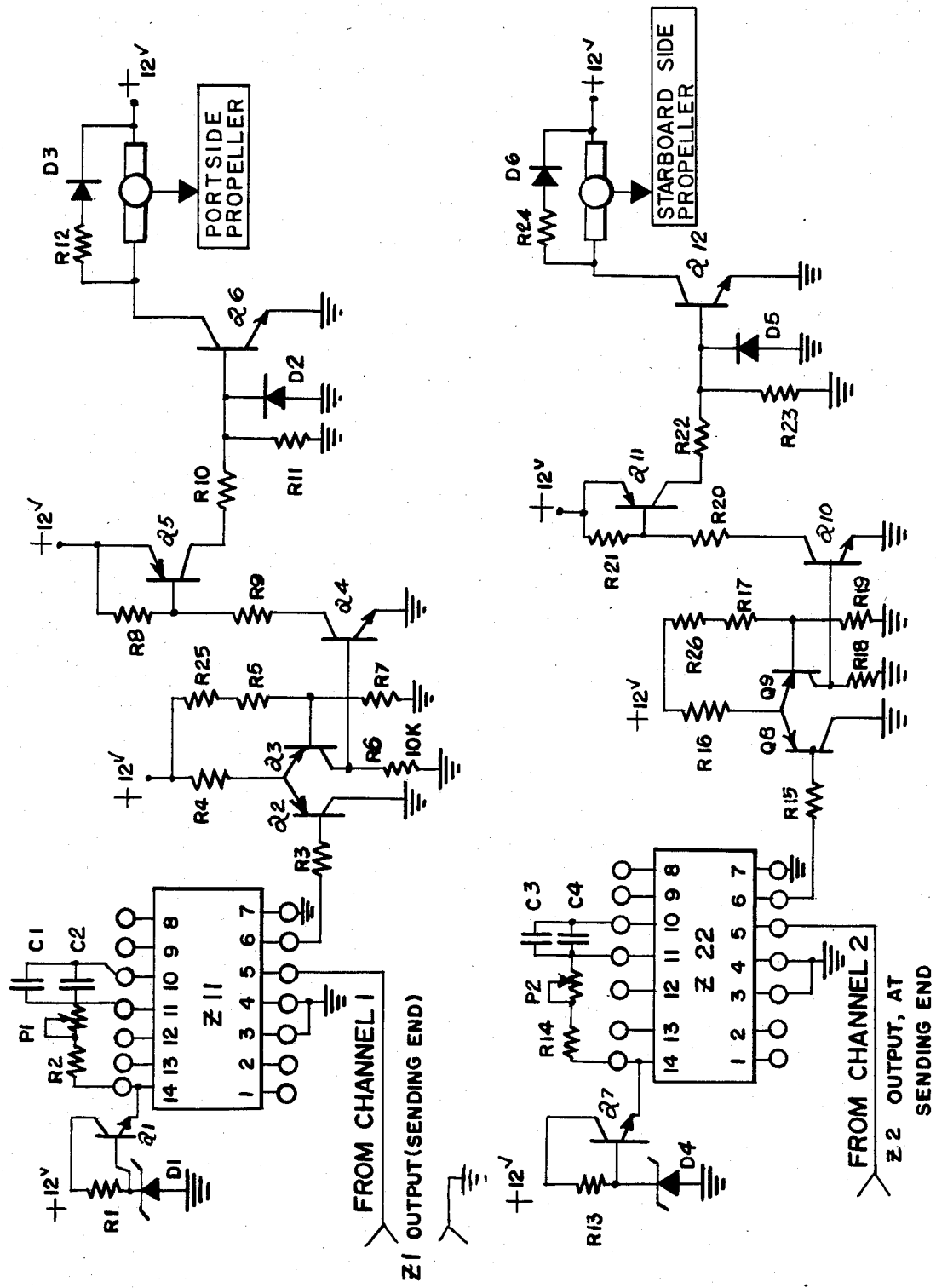

United States Patent [19]

Granchelli

[11] Patent Number: 4,626,757

[45] Date of Patent: Dec. 2, 1986

[54] BOAT CONTROLLER

[76] Inventor: Ralph S. Granchelli, 79 Joseph Rd., Framingham, Mass. 01701

[21] Appl. No.: 588,975

[22] Filed: Mar. 13, 1984

[51] Int. Cl.⁴ ............................................. G05D 1/00
[52] U.S. Cl. ..................... 318/588; 318/66; 318/77; 318/341; 114/144 RE
[58] Field of Search ................ 318/252, 588, 589, 77, 318/66, 78, 341; 114/144 RE

[56] References Cited

U.S. PATENT DOCUMENTS

| | | | |
|---|---|---|---|
| 3,303,403 | 2/1967 | Bonanno | 318/257 |
| 3,662,243 | 5/1972 | Cavil et al. | 318/588 |
| 3,865,063 | 2/1975 | Norton | 318/588 X |
| 3,940,674 | 2/1976 | Gill | 318/589 |
| 4,166,238 | 8/1979 | Binner | 318/77 |
| 4,275,394 | 6/1981 | Mabuchi et al. | 318/78 |
| 4,310,787 | 1/1982 | Seeger et al. | 318/78 X |
| 4,334,175 | 6/1982 | Tanaka et al. | 318/66 |
| 4,361,788 | 11/1982 | Melocik | 318/341 X |

Primary Examiner—B. Dobeck

[57] ABSTRACT

An electronic boat controller which can be plugged in and removed from a boat which is hard wired to a plurality of locations which when plugged into allows the boat controller to become electrically wired to power controllers which supply power on a pulse basis to electric motors from a common power supply. This power supply is an electric battery mounted at the rear of the boat. The controller controls two channels which control ultimately two power supplies to two separate and distinct electric motors which are spacially separated at the rear of the motor permitting turning as well as forward control of the boat.

7 Claims, 4 Drawing Figures

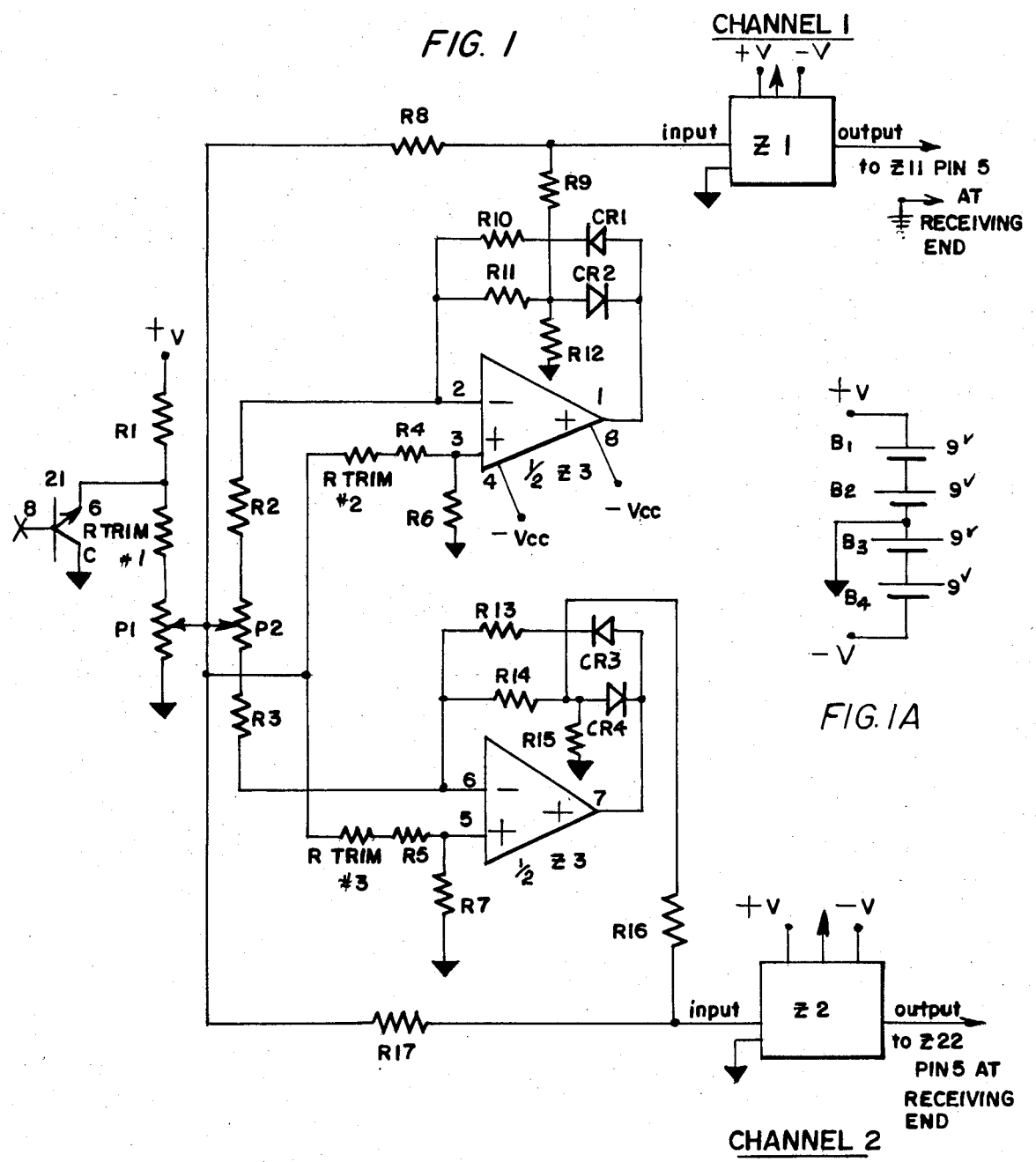
FIG. 1
FIG. 1A
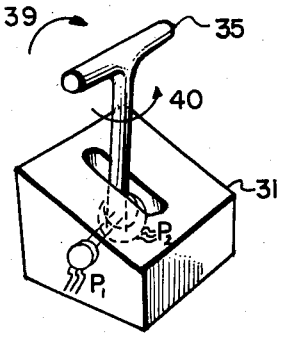
FIG. 3

BOAT CONTROLLER

After working in the field of controllers and power supplies to electric propelling devices on boats for a number of years, I have discovered certain base requirements that must be accommodated in order to achieve a desirable and useful end product that is both inexpensive and efficient in its operation.

The most important principle that I have discovered is easily understood once stated. Electric propulsion of boats is well documented and has very distinct advantages. Fishermen prefer them for trawlers because of their slow speed and quiet operation, also the electric motor uses battery power which instantly starts and is turned off and restarted with little difficulty. The electric propeller systems are virtually maintenance proof; however, the storage of power is limited to the capacity of the battery. The battery has a great deal of weight, but once it is fully charged it can last for a considerable time; nevertheless, the efficiency of the use of power is of paramount concern. The simplest control of any electric motor is a rheostat. It is fundamental that a rheostat is dissipative of power. Nearly twice the power that is necessary for propulsion at trolling speeds is dissipated in the rheostat and, accordingly, the life expectancy of the charge is reduced to about one half of what it would be for an efficient system at similar speeds. Accordingly, I have discovered that pulse power with a varying duty cycle feeding the electric motor from the battery is the most efficient way to utilize power up to nominal speeds. A system for controlling power to an electric motor that involved pulse power with a varying duty cycle would be the most efficient and therefore the most desirable for electric motors propelling boats.

In my adaptation of such systems to boats I have discovered numerous other factors. One of the factors that I have discovered is that in the propulsion of the boat a single electric motor located at the rear of the boat is difficult to steer for a user who is optimally midway in the boat or even forward if he is fishing, and even if he is boating for pleasure. A compelling reason for the operator to be forward in the boat is weight distribution. The heavy battery and motor is aft, and he is forward. A dual driven boat with two separate, distinct motors provides, without the need for a rudder, the turning ability, port or stern, necessary in the maneuvering of the boat. Accordingly, twin screws, which have been used on larger boats, have not been applied to smaller boats. I have successfully propelled small boats with twin screws that were electrically driven, with exectional performance.

Once one has decided to use twin screws in the controlling of a boat, the controller, made necessary above, has to have two channels. In order to have a dual channel power supply it is necessary that the individual channels do not permit cross talk between channels which would then frustrate the control of the individual electric motors to such an extent that accuracy of control would be lost. I, therefore, have discovered a system of dual channeled pulse powered supply to individual twin screw electric propellers which does not permit cross talk or any possible channel cross interference.

Having discovered the twin screw propelled boat with pulse power supply and dual channel, I found that the wiring on the boat could greatly be reduced in weight and size if in effect a telemetry type system was utilized for the controller which is remote from the power supply to the boat and the propelling motors. I, therefore, discovered the useage of voltage to frequency units which would send pulsed frequency signals proportional to voltage applied to the converters via a steering wheel or equivalent and that variable frequency signal would then be received and current amplified for pulse power at the stern of the boat where the electric motors were mounted.

With the present invention all of the heavy wires between the motors and the battery are located at the rear of the boat and very thin telemetry wires extend from the controller portion which feeds the motors which further reduces power loss as well as the economical use of heavy wiring.

In maneuvering a boat with a twin screw one does not need a rudder. Further, reverse is desirable in a boat; however, in a small boat it is unnecessary. Accordingly, I have developed in the simplest form a system which propels a boat forward by twin screws and turned by means of a simple potentiometer slowing down one screw or the other. I have developed a unique circuit which enables the unit to be reversed. If one will observe sailers in small craft, they are propelled forward and never in reverse and effectively maneuver their boats very well, so reverse is not an essential part of the controller in its least expensive form.

The circuitry involved in the development of the system is of necessity quite unique. Essentially, I have reduced the system down to a very minimal circuit arrangement. The development of a forward voltage for both channels from a single potentiometer. I also developed a circuit fed by a second potentiometer which when turned clockwise produced a negative voltage which reduced the net voltage being fed to one channel's "v" to "f" converter. If it were turned counter clockwise the same would happen to the other channel, that is a negative voltage would be fed reducing the net voltage being applied to the other "v" to "f" converter in the opposite channel. Such a system is very simple, effective and efficient in the utilization of components. The controller supplies two channels with voltage to frequency signals through very thin wires which are then applied to a power amplifier which are hard wired to the windings of the electric motors from the battery located immediately adjacent to the battery at the stern of the boat.

Therefore, an object of the present invention is to provide a controller for twin screw boat propulsion.

Another object of the present invention is to provide controlled twin screw operation in electrically propelled boats.

Another object of the present invention is to provide dual channel electrically controlled power to twin screw bolts.

Another object of the present invention is to provide a pulsed power to electric motors for boat propulsion.

Another object of the present invention is to provide a remote controller for electrically powered twin screw boats that is wired between controller and pulsed power supply with light wires.

Another object of the present invention is to provide a dual channel controller to a common power supply that produces controllable power to selected motors.

Other objects, features and advantages of the present invention will be better understood with reference to the following specifications especially with reference to the attached drawings of which FIG. 1 is the sending signal end of a boat controller.
FIG. 2 is the receiving end of a boat controller.
FIG. 3 is a control configuration.

Referring now to the drawings. FIG. 1 shows the first major portion of the invention. This is the sending end. FIG. 2 shows the receiving end. The sending end is completely independent having three output leads: a ground lead with a first channel output and a second channel output. The output leads are extremely thin wire and need not be specially shielded and only flexible enough to be hard wired in the boat. The concept of separating the sending and receiving ends permits interconnection with very small wires that are unshielded. Therefore, sending end outlets can be located at multiple places on any craft. The receiving end, on the other hand, is located adjacent to the battery which feeds the separate electric motors by separate channels and, of course, requires much more substantial wiring to handle large currents. This is the most economical method and only efficient way to deal with electrically powered motors.

Referring now more specifically to FIG. 1, we see that the device has basically a power supply as shown as FIG. 1A, composed of nine volt batteries. These nine volt batteries have a life expectancy of well over a year and must be replaced each season. The point of having an independent power supply is a substantial advance over the prior art, and enables one to wire the systems together with a minimal amount of expense and enjoy an unheard of amount of flexibility.

Also to be noted in FIG. 1 is the simplicity of the device. There are basically two potentiometers, P1 and P2. P1 is the acceleration potentiometer and its output is applied to the turning potentiometer, P2. Both potentiometers are controlled by a lever which will be shown more clearly in FIG. 3. The user advances the shaft causing the first potentiometer to develop a voltage which is applied to the second potentiometer. When the shaft is turned either clockwise or counterclockwise, it causes the second potentiometer to direct the signal proportional to the shaft angle to two separate channels. It is seen that P2 basically feeds one operational amplifier in each channel. Each operational amplifier then feeds through appropriate circuitry to V to F converters Z1 and Z2. The operational amplifier Z3 has two segments and they are identical.

A unique feature of this circuit is in the use of only two potentiometers. What happens is this: as the signal to the top ½ of Z3 gets larger, the bottom half of Z3 becomes ineffective in the circuit. When a larger signal is applied to lower ½ of Z3 and a lesser output is applied to top ½ of Z3, the reverse happens and the top half becomes ineffective.

The following is a detailed parts list for the components of FIG. 1:

Q1--2N3904 NPN xistor
Z1, Z2. V-F converters. Type 4711, MFD. by Teledyne/Philbrick
Z3--Type 1558, Dual Operational Amplifier, MFD by RCA (or Equiv.)
All Registers ¼ watt, carbons, in ohms:

| R1 | 6.2K ± 5% | R8 | 693K ± 1% (selected from |
| R2 | 510K ± 5% | | 680K 5% resistors) |
| R3 | 510K ± 5% | R17 | 693K ± 1% (selected from |
| R4 | 510K ± 5% | | 680K 5% resistors) |
| R5 | 510K ± 5% | R9 | 348K ± 1% (selected from |
| R6 | 510K ± 5% | | 150K & 200K 5% resistors) |

-continued

| R7 | 510K ± 5% | R16 | 348K ± 1% (selected from |
| R10 | 1 meg. ± 5% | | 150K & 200K 5% resistors) |
| R11 | 1 meg. ± 5% | R trim #1 | 2.5K ± 5% typical |
| R12 | 1K ± 5% | R trim #2 | 15K ± 5% typical |
| R13 | 1 meg. ± 5% | R trim #3 | 15K ± 5% typical |
| R14 | 1 meg. ± 5% | | |
| R15 | 1K ± 5% | | |

CR1, CR2, CR3, CR4 IN4148 silicon diodes
(speed) P1: 5K single turn pot, 2 watts, Allen Bradley or equivalent (turn) P2 1 meg. single turn pot, 2 watts, Allen Bradley or equivalent B1, B2, B3, B4,, 9 v, 1000 MA-HR Dura Cells.

The individual components of FIG. 1 are carefully laid out in detail enabling anyone to construct the specific circuit in the instant invention. Certain general concepts should be understood in considering this circuit. The theory of operation is that when an operator wants to accelerate his boat, he applies increased voltage through potentiometer P1 to both V-F's for increased signal frequencies through channels one and two. We have two electric motors responsive to the signal frequencies sent through the two separate channels. The two motors are in full acceleration when maximum signal frequency is applied to both motors. Then if the operator wishes to turn, left or right, with max signal frequencies for full average voltage on both motors, he reduces the signal frequency to one channel. This is done by turning P2, which applies less voltage through the operational amplifier to one of the V to F converters for a decrease in frequency and therefore less average voltage to that motor. The larger voltage from P1 to the first V-F produces an unchanged signal frequency from that channel; therefore, its motor remains at full speed while the lesser voltage applied to the second V-F results in that channel's motor slowing down because a lower frequency is applied to it. The boat turns in the direction of the motor of the slower speed. And of course if the opposite is done at the high speed again, the motor will slow down on the opposite side and the other motor will remain at full speed ahead and the boat will turn in the opposite direction.

Now if the boat is stopped, for zero volts at P1, no matter which way potentiometer P2 is turned, no voltage being applied to it, nothing will happen. If at half speed, potentiometer P1 applies half voltage to both V-F's and therefore the motors are both at half speed. And if the turning potentiometer P2 is then turned, the signal frequency applied to one channel remains nearly unchanged. The other channel's frequency, however, decreases and that channel's motor will slow down while the other speeds up only slightly and the boat will turn in the direction of the slowed down motor. When the reverse of that happens, the other channel receives a decreased frequency and the boat turns in the opposite direction.

It is to be seen here that in order to have maximum acceleration available to the boat, both motors have to be at maximum acceleration and when a turn is desired, one of the motors must be slowed down. If any other dual steering configuration were deployed you could not have maximum acceleration of the boat's motors. You, therefore, could not have an efficient propulsion system. This inventor has discovered that this type of a channel control, i.e. the slowing down of one motor is the most efficient and the only effective way of utilization of propulsion from two motors.

It is to be noted that sensitivity of turning at the high speed is at its maximum. Additionally, slowing down of a motor gives one much more control over the direction of the boat as opposed to turning down one side and accelerating another at the same time. Even at mid-range speed, only one motor is turned down; the other motor's speed remains unchanging during a turn.

The detailed parts list above will enable anyone skilled in the art to fabricate this invention with no difficulty whatsoever. The items are purchasable from any electronics distributor. Where necessary, specific suppliers have been indicated but many substitutions can be made in those listed parts without any difficulty.

Once the two channel signals are produced, they are transmitted to the rear of the boat where a large battery is connected to two separate motors as shown in FIG. 2. Again, each of the circuit components is carefully laid out.

The following is a parts list:

| Resistors (in ohms) | | | | Capacitors | |
|---|---|---|---|---|---|
| R1, R13 | 2K | ¼ watt | 5% | C2, C4 | 0.1 MF Mylar or Ceramic |
| R2, R14 | 10K | ¼ watt | 5% | C1, C3 | 0.047 MF Mylar or Ceramic |
| R3, R15 | 270 | ¼ watt | 5% | Z1, Z2 5421 Multivibrator mfd. by | |
| R4, R16 | 910 | ¼ watt | 5% | Motorola or Equiv. | |
| R5, R25 | 6.2K | ¼ watt | 5% | P1, P2 10K trim pots | |
| R17, R26 | 6.2K | ¼ watt | 5% | single or multi-turn | |
| R7, R19 | 2.7K | ¼ watt | 5% | (typically set close to 10K) | |
| R9, R20 | 82 | 2 watt | 5% | Transistors | |
| R8, R21 | 510 | ¼ watt | 5% | Q1, Q7, Q4, Q10 | 2N2222 NPN |
| R10, R22 | 7.5 | 20 watt | 5% | Q2, Q3, Q8, Q9 | 2N3906 PNP |
| R11, R23 | 100 | ¼ watt | 5% | Q5, Q11 | 2N4919 PNP |
| R12, R24 | 3 | 10 watt | 5% | Q6, Q12 | 2N5302 NPN |
| Diodes | | | | | |
| D1, D4 | IN753 | | | | |
| D2, D5 | IN3879 | | | | |
| D3, D6 | IN3889 | | | | |

Where necessary, specific reference to a manufacturer is indicated above. Many changes may be made without altering this circuit. The frequency signals produced in each channel by the V to F converter are applied to a multivibrator which converts them to a string of pulses. The spacing of the pulses determines the amount of power that is applied to the individual motors. The multivibrator signals are amplified through Q4, Q5, Q6, Q10, Q11 and Q12 for power.

When the multivibrators receive a maximum frequency signal, a nearly continuous pulse (or maximum duty cycle) will be applied to the motors. In other words, a nearly uninterrupted continuous DC is applied to the motor, and they run at maximum speed. On the other hand, when the frequency is reduced out, then the pulses generated by the multivibrator in response thereto sends wider spaced pulses to the individual motors. Wider spaced pulsed power DC signals applied to the motors causes them to run at lower speed. It is to be pointed out here, that the substantial advantage of pulsed power to electric motors is to extend the battery charge immensely. At maximum signal, the electronics dissipation of power in this device would be some additional loss; that presupposes that both motors are going full speed ahead.

On the other hand, if a rheostat were utilized, the dissipation in the rheostat would be minimal at full power. But, as soon as the motors are not at full power, i.e. somewhere between full and zero power, dissipation in the rheostat becomes large. When the motors are idling, the dissipation in the rheostats is maximum at about 70% of the system power. In the instant invention, with pulse power, the losses in the electronics are fairly constant and amount to a small percentage on the overall power utilization in the system, on the order of 10% or 20%. Accordingly, pulse power at idling and at maximum speed anywhere in between has a near constant high efficiency; but where the boat is likely to be run, i.e. low to mid-speed, the actual power loss decreases substantially compared to full speed operation and as indicated before is far less than losses in a rheostat system at these speeds.

Pulse power is a substantial advance in the state of the art. It is especially to be considered when dealing with boats which have a finite amount of power stored in their batteries. Any increase in efficiency by an additional 10% to 30% as in the present invention extends the range of the boat considerably. In the present case, the optimum circumstance is that the boat is used for trawling where efficiency improvement over rheostat control of better than thirty percent is experienced.

Therefore, this instant invention can almost double the range, heretofore unavailable on a rheostat-controlled system.

Those components used in FIGS. 1 and 2 are readily available from an electronics supplier and can be connected without any difficulty. The electric motors, of course, are available from a variety of suppliers that are already used to propel small craft. One such manufacturer is Shakespeare. Any craft can be equipped with an electric motor coupled to propeller to drive it. The voltage supply in this case would be the ordinary 12 volt battery with acid/lead plates, which has approximately one thousand to fifteen hundred watt hours capacity.

Referring to FIG. 3, we see a general configuration of the invention. Here we see a control device which contains all of the electronics of the sending device. When the handle 35, is pushed forward as shown by arrow 30, potentiometer P1 is advanced and a maximum amount of voltage is applied by channel frequency control to two electric motors and the boat goes full speed ahead. As the handle 35 of FIG. 3 is twisted left or right in accordance with arrows 39 and 40, the boat will go left or right because potentiometer P2 is turned such that the distribution of voltage 1 is channelled through channel 1 or channel 2 differently to the electric motors. One of the motors is slowed down.

The box 31 containing the electronics can be very small, because the circuitry with the benefit of microelectronics can be compressed into a very small component, perhaps the size of a package of matches. On the other hand, it can be made large enough to provide a sense of substance in the handles. If that is the case, the handles will have to be weighted such that it will have some resistance when it is accelerated or decelerated. Where this type of unit will most often be used for fishermen, trawling, the units will usually be placed in an accelerated position and left there while the fishermen does his fishing. Of course the boat will move away from the operator if he falls overboard. A dashpot or a biasing return spring can be added which requires that it will return the handle to zero so that the operator would have to hold on to the handle when he is operating the boat on a continuous basis. Such mechanisms are well known in the state of the art, and can be put into operation such that trawling speed can be selected and locked into position or a spring bias can return it to zero speed.

It is to be noted here throughout this invention that only forward speed is covered, together with left and right. Reverse can be incorporated into such a circuit; however, the cost of the electronics outweighs its worth. The present invention is more useful in its present form. Just as a sailboat may take more than one pass docking, with the present scheme no difficulty is experienced.

Although I have described my invention with reference to specific apparatus I do not want to be limited thereby. Many substitutions and variations can be made without departure from the true scope and spirit of my invention.

I claim:

1. A boat controller in combination with two spacially separated twin screw electric motor-propellers comprising,
    a battery for storage of power to said motors,
    means for accelerating each propeller independently interposed between said motors and said battery,
    command means having a first and second channel for controlling said accelerating means separately and remote from said accelerating means,
    first control means for signaling said first and second channels of said command means uniformly,
    second control means for signaling one channel at a time of said command means,
    lever means movable about a mid-point forward and backward and rotable, clockwise and counter-clockwise a preselected number of degrees, about a central point,
    means responsive to said forward movement of said lever for controlling said first control means uniformly,
    means responsive to the turning of said lever means clockwise reducing the second control means signal to the first channel of said command means and responsive to the turning of said lever means counter-clockwise reducing the second control means' signal to the second channel of said command means whereby one of said motors is reduced in acceleration with respect to the other motor.

2. A boat controller according to claim 1 wherein said accelerating means is a dual channel, pulse power, variable duty cycle power circuit responsive to frequency signals.

3. A boat controller according to claim 2 wherein said signaling means is a voltage to frequency converter.

4. A boat controller according to claim 3 wherein said first control means is a gaged potentiometer supplying a variable voltage to a turn potentiometer means and a voltage to frequency converter simultaneously.

5. A boat controller according to claim 4 wherein said second control means is a potentiometer supplying a voltage of opposite polarity to a selected voltage to frequency converter in accordance with the clockwise or counterclockwise rotation of the potentiometer whereby the boat turns port or starboard in agreement with said rotation.

6. A boat controller according to claim 4 wherein said first control means includes its own power supply.

7. A boat controller according to claim 6 wherein said second control means includes two identical circuits which enter an ineffective voltage state when the other circuit is producing turn controlling signals.

* * * * *